(12) United States Patent
Kolunthavelu et al.

(10) Patent No.: US 8,379,363 B1
(45) Date of Patent: Feb. 19, 2013

(54) BULK ERASE TOOL TO ERASE A PERPENDICULAR MEDIA RECORDING DISK OF A DISK DRIVE

(75) Inventors: Pusphanathan Kolunthavelu, Rawang (MY); Anandan Vengadasalam, Batu Caves (MY)

(73) Assignee: Western Digital Technologies, Inc., Irvine, CA (US)

( * ) Notice: Subject to any disclaimer, the term of this patent is extended or adjusted under 35 U.S.C. 154(b) by 420 days.

(21) Appl. No.: 12/748,068

(22) Filed: Mar. 26, 2010

(51) Int. Cl.
*H01F 13/00* (2006.01)

(52) U.S. Cl. ........ 361/267; 361/143; 361/147; 361/149; 361/150; 360/66; 360/137

(58) Field of Classification Search ............ 360/66, 360/137; 361/143, 147, 149, 150
See application file for complete search history.

(56) References Cited

U.S. PATENT DOCUMENTS

| | | | |
|---|---|---|---|
| 5,416,664 A | 5/1995 | Becker et al. | |
| 6,570,727 B1 * | 5/2003 | Tamura et al. | 360/66 |
| 6,731,491 B2 | 5/2004 | Schultz | |
| 6,747,823 B2 | 6/2004 | Saito et al. | |
| 7,548,406 B2 | 6/2009 | Yoon | |
| 7,852,590 B1 * | 12/2010 | Olliges | 360/66 |
| 7,944,640 B2 * | 5/2011 | Huang et al. | 360/66 |
| 2006/0018075 A1 | 1/2006 | Schultz | |
| 2006/0146435 A1 * | 7/2006 | Hasegawa et al. | 360/66 |

* cited by examiner

*Primary Examiner* — Rexford Barnie
*Assistant Examiner* — Tien Mai

(57) ABSTRACT

A bulk erase tool to erase a perpendicular media recording (PMR) disk of a disk drive is disclosed. The bulk erase tool comprises a housing to receive a disk drive and at least one of a first pair of magnets mounted in the housing to be positioned above the received disk drive to provide a magnetic field to erase the top side of the disk and a second pair of magnets mounted in the housing to be positioned below the disk drive to provide a magnetic field to erase the bottom side of the disk.

20 Claims, 4 Drawing Sheets

BULK ERASE TOOL TO ERASE A PERPENDICULAR MEDIA RECORDING DISK OF A DISK DRIVE

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly ("HGA") with a moveable transducer head for reading and writing data. The HSA forms part of a servo control system that positions the moveable head over a particular track on the disk to read or write information from and to that track, respectively.

During disk drive manufacturing, a disk drive typically undergoes a variety of tests and procedures to configure and validate the proper operation of the disk drive. Because disk drive testing represents such large expenditures for disk drive manufacturers, more efficient test equipment and testing procedures are continuously sought after in order to reduce inefficiencies and costs and to increase disk drive throughput.

In particular, when assembling the mechanical components to form the disk drive, servo patterns are written on the new disks to prepare the disk drive for customer use. However, there are often cases when the servo patterns need to be re-written. In those cases, existing servo patterns have to be erased and new servo patterns have to be re-written. For example, servo patterns have to be re-written when the initial servo writing fails, or if the servo writing was successful—but the disk drive fails functionality tests, along with many other disk drive testing situations.

As one particular example of servo writing, many disk drives have the capability to self-servo write servo sectors. During self-servo writing, the internal electronics of the disk drive are used to write the servo sectors. One technique used in self-servo writing disk drives is for the head of the disk drive to write a plurality of spiral reference patterns to the disk which are then processed by the disk drive to write the servo sectors along a circular path. For example, the spiral reference patterns may be written by moving the head from an outer diameter of the disk to an inner diameter of the disk. In the self-servo writing process, the head then writes the final servo sectors by servo-ing on the seeded spiral patterns.

However, during the spiral reference pattern writing process, errors may occur that affect the radial and circumferential position and slope of the spiral reference patterns and degrade the spiral patterns. If there are any failures during the spiral writing process, the disk may need to be fully erased before re-writing can occur. Unfortunately, this requires an additional amount of time and cost to fully erase and then re-seed the disk.

Bulk erase tools have been previously used as a magnetic device to erase the servo patterns on the disk of a disk drive. The advantage of using the bulk erase tool over using the head to erase within the hard disk drive is the fast and easy operation of the bulk erase tool. However, current bulk erase tools used in disk drive testing do not adequately erase servo patterns in an efficient enough manner. Accordingly, more efficient bulk erase tools are sought after.

DETAILED DESCRIPTION

Figure 1:
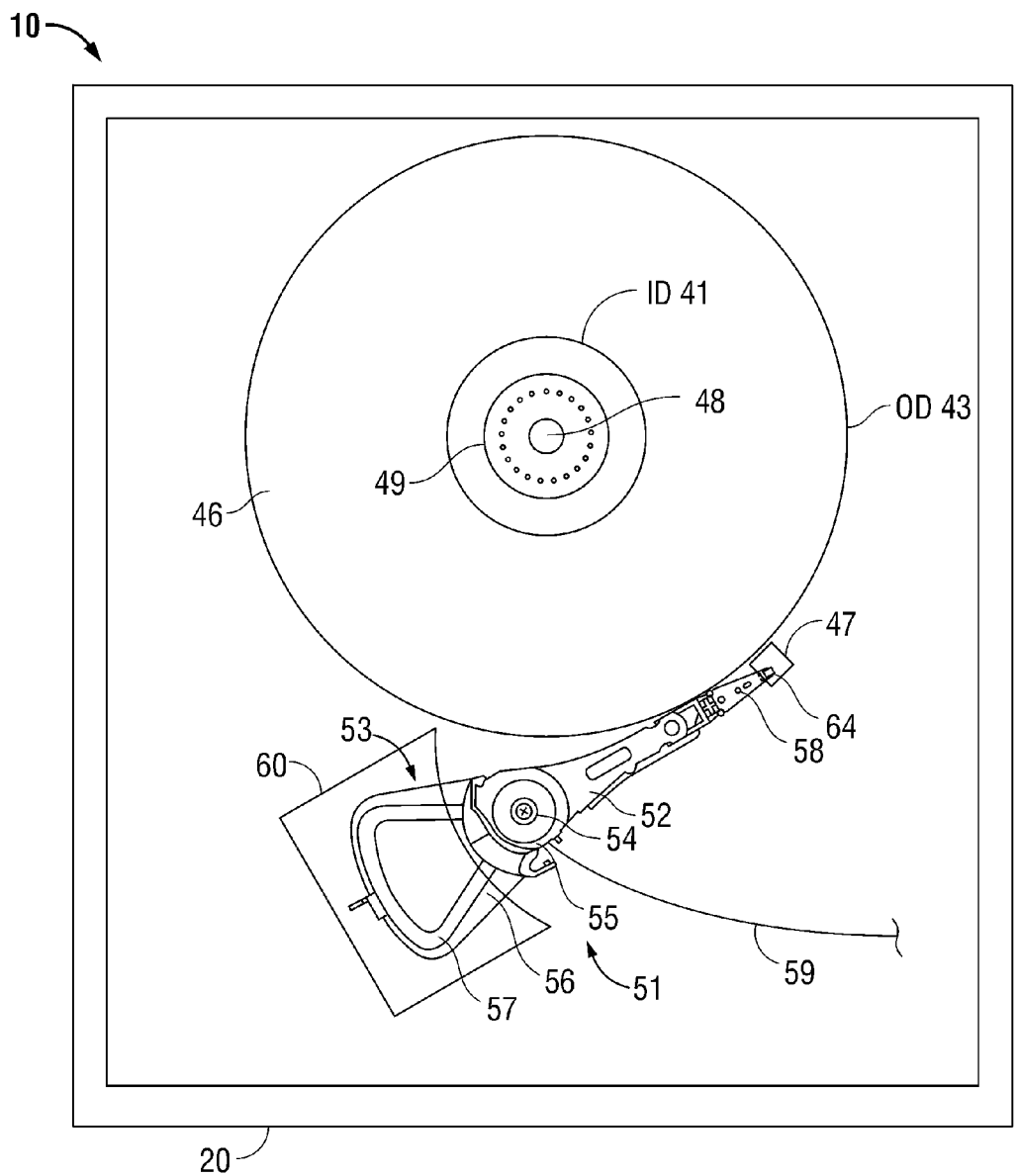
FIG. 1 is a schematic diagram of a disk drive with the cover removed.

FIG. 1 is a schematic diagram of a hard disk drive 10 with the cover removed. FIG. 1 shows the components of the hard disk drive 10 assembled within the base plate 20. In this example of a hard disk drive, a rotary actuator assembly 51 is shown relative to a disk 46 for pivoting the head 64 of the rotary actuator 51 about the disk to perform disk drive operations including read/write operations, as well as, other disk drive operations.

Disk 46 may be mounted within the disk drive 10 on a spindle 48 utilizing a disk clamp 49 for rapid rotation within the disk drive. The rotary actuator 51 in turns moves head 64 over the disk 46. The rotary actuator 51 may be part of a head stack assembly (HSA). It should be appreciated that HSAs and rotary actuators are well known in the art, and this is but one example.

Looking at this particular example, rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 which supports head 64 for writing and reading data to and from the disk 46, respectively.

A flex circuit cable 59 connects to the processing circuitry of the printed circuit board assembly of the disk drive to the rotary actuator 51 of the HSA in order to deliver commands such as read/write commands, seeking and tracking commands, etc.

The coil assembly 53 may include a coil 57 and a fork 56. The fork 56 may be cantilevered from the body portion 55 in an opposite direction from the actuator arm 52 and mounts the coil 57. The rotary actuator 51 is pivotally secured to the base of the disk drive via the pivot bearing cartridge 54 through the pivot bore of the body portion 55 of the rotary actuator arm 51. In this way, the head 64 at the distal arm of the HGA 58 may be moved over a surface of the disk 46.

However, in this example, the HGA 58 and the head 64 are shown as being parked on the ramp 47. This is for the purpose of utilizing the bulk erase tool as part of the manufacturing process, as will be described.

Further, it should be appreciated that the rotary actuator 51 may include a vertical stack of HGAs supported by multiple actuator arms for use with multiple vertically stacked disks 46.

Also, as is well known, a voice coil motor (VCM) may be utilized with the rotary actuator 51 in order to precisely position actuator 51 under the control of a servo controller. In one example, the VCM may include one or more VCM plates 60 which include a permanent magnet. The coil 57 of the rotary actuator 51 may be disposed between the top and bottom VCM plates (only top plate 60 being shown) in order to form a voice coil motor (VCM) to cause the pivoting of the actuator 51 about the pivot access defined by the pivot bearing cartridge 54 by inputting current into the coil 57. Thus, the VCM can be used to controllably position the head 64 of the actuator 51 relative to the disk. As an example, the head 64 may be moved between the outer diameter (OD) 43 and the inner diameter (ID) 41 of the disk 46.

However, it should be appreciated that many other types of actuators and positioning means for the actuator may be utilized, and this is just one example. Moreover, this is just one example of a hard disk drive (HDD) 10, and a wide variety of different types of disk drives, may be utilized with embodiments of the invention. Further, in this example, disk 46 is a perpendicular media recording (PMR) disk, but other types of disks may be utilized.

Figure 2:
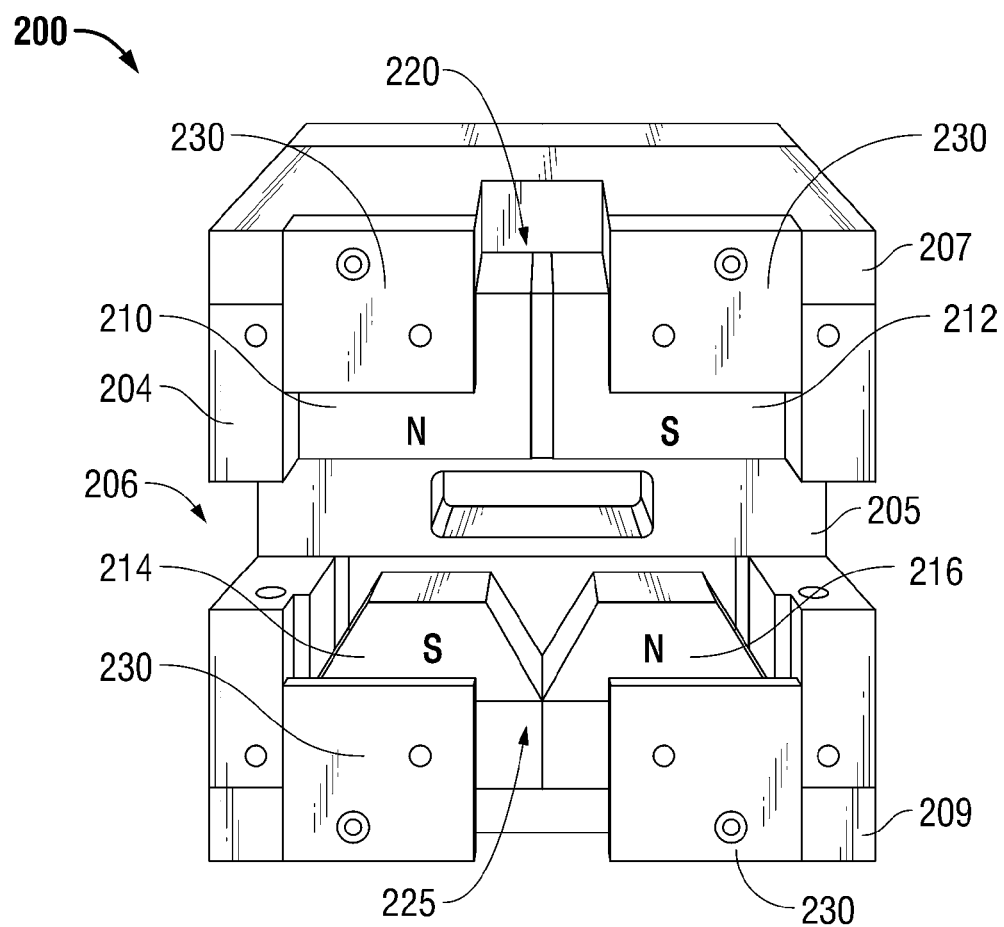
FIG. 2 is an exemplary front view of a bulk erase tool to erase a PMR disk of a disk drive, according to one embodiment of the invention.

FIG. 2 is an exemplary front view of a bulk erase tool 200 to erase a perpendicular media recording (PMR) disk of a disk drive, according to one embodiment of the invention. The bulk erase tool 200 includes an approximately square-shaped housing 204 to receive a disk drive. In particular, the housing 204 may include a back-wall 205 and an approximately U-shaped top section 207 and bottom section 209 that form an approximately rectangular-shaped channel 206 in which the disk drive may be inserted either manually or by a robotic device, as will be described.

Further, in one embodiment, four different magnets 210, 212, 214, and 216 may be mounted within recesses formed in the top and bottom sections 207 and 209 of the housing 204. Thus, the housing 204 may include a top mounting portion 220 in which the top magnets 210 and 212 may be mounted and a bottom portion 225 in which the bottom magnets 214 and 216 may be mounted. Additionally, approximately square-shaped mounting walls 230 may be mounted to the top and bottom sections 207 and 209 of the housing 204 and the magnets to mount the magnets within the top and bottom mounting portions 220 and 225 of the housing 204 by screws, bolts, pins, rivets, or other suitable mounting means.

Thus, in one embodiment, a first pair of magnets 210 and 212 are mounted in the housing 204 such that they may be positioned above a received disk drive in the disk drive channel 206. The first pair of magnets 210 and 212 may be used to provide a magnetic field to erase the top side of the disk of a disk drive. The second pair of magnets 214 and 216 may be mounted in the bottom of the housing 204 such that they may be positioned below the received disk drive in the disk drive channel 206 to provide a magnetic field to erase the bottom side of the disk of the disk drive.

As can be seen in FIG. 2, in one embodiment, each of the first pair of top magnets 210 and 212 are approximately parallel to one another. Further, the bottom magnets 214 and 216 are similarly approximately parallel to one another. Accordingly, the first pair of magnets 210 and 212 are approximately parallel to the second pair of magnets 214 and 216. In particular, each of the magnets 210 and 212 of the top pair of magnets are approximately vertically aligned with the magnets 214 and 216 of the bottom pair of magnets.

Moreover, as will be described in more detail, the magnets of the first pair of top magnets 210 and 212 (N and S) and the magnets of the second pair of bottom magnets 214 and 216 (S and N) are of relatively opposite polarity to one another. Further, as can be seen in FIG. 2, the first pair of top magnets 210 and 212 may be approximately square-shaped whereas the second pair of bottom magnets 214 and 216 may be approximately pyramid-shaped.

Figure 3:
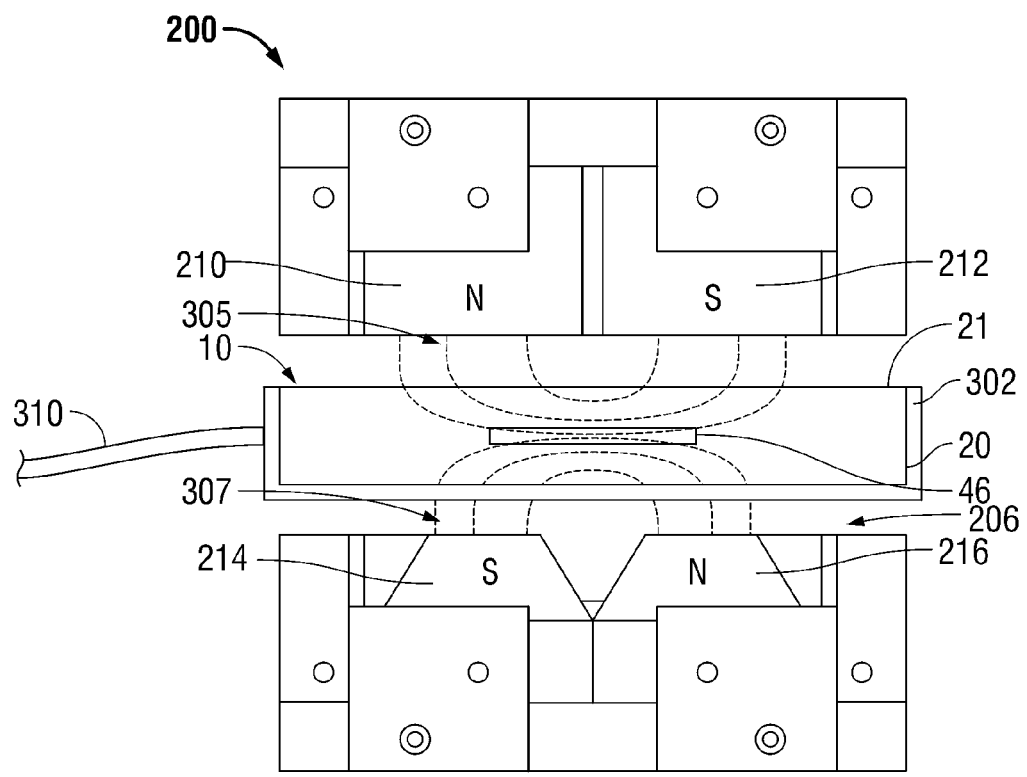
FIG. 3 is a diagram illustrating the bulk erase tool erasing a PMR disk of a disk drive, according to one embodiment of the invention.

Referring now to FIG. 3, FIG. 3 is a diagram illustrating the exemplary bulk erase tool 200 erasing a perpendicularly media recording (PMR) disk 46 of a disk drive 10, according to one embodiment of the invention. As shown in FIG. 3, disk drive 10 may be inserted into the channel 206 of the bulk erase tool 200 to erase the top and bottom side of the disk 46. In particular, the top pair of magnets 210 and 212 having opposite polarity to one another generate a first magnetic field 305 that may erase the top side of the disk 46 of the disk drive 10. Similarly, the bottom pair of pyramid-shaped magnets 214 and 216 likewise generate a magnetic field 307 that may erase the bottom side of the disk 46 of the disk drive 10.

However, it should be appreciated that if disk drive 10 includes multiple stacked disks, the top magnetic field 305 may be used to erase both the top and bottom sides of the higher level disks and the lower magnetic field 307 may be used to erase the top and bottom sides of the lower level disks.

As shown in FIG. 3, in one embodiment, disk drive 10 may be inserted into the channel 206 of bulk erase tool 200 by an approximately U-shaped nest plate 302. The U-shaped nest plate 302 may be used for mounting and holding the disk drive 10 while the bulk erase tool 200 is robotically moved around the disk drive (i.e., within channel 206) to apply the magnetic fields. Alternatively, the nest plate 302 may robotically move the disk drive 10 in and out of the channel 206 of the bulk erase tool 200. It should be appreciated that other suitable means may likewise be utilized to move the disk drive 10 in and out of the channel 206 of the bulk erase tool 200.

Further, nest plate 302 may be coupled to a wire 310 that applies power to the disk drive 10 to rotate the disk(s) 46 while the magnetic fields 305 and 307 are being applied. In one embodiment, the nest plate 302 may have a plurality of pins that are received by the disk drive 10 to apply power to the disk drive, and more particularly, to drive the spindle motor to rotate the disk(s) 46 while the magnetic fields 305 and 307 are being applied.

It has been found that the pyramid-shaped magnets 214 and 216 apply a relatively strong magnetic field that penetrates the thicker portion of the bottom of the base plate 20 to erase the disk(s) 46 of the disk drive 10 whereas the square-shaped top magnets 210 and 212 apply a relatively less but sufficient magnetic field to penetrate the cover 21 of the disk drive 10. Further, it has been found that by using this combination of magnetic fields, the spindle motor is not degraded.

In one embodiment, each of the magnets 210, 212, 214, and 216 may be composed of a clean room (CR) material. In one particular embodiment, the CR material may be a N52 material.

Figure 4:
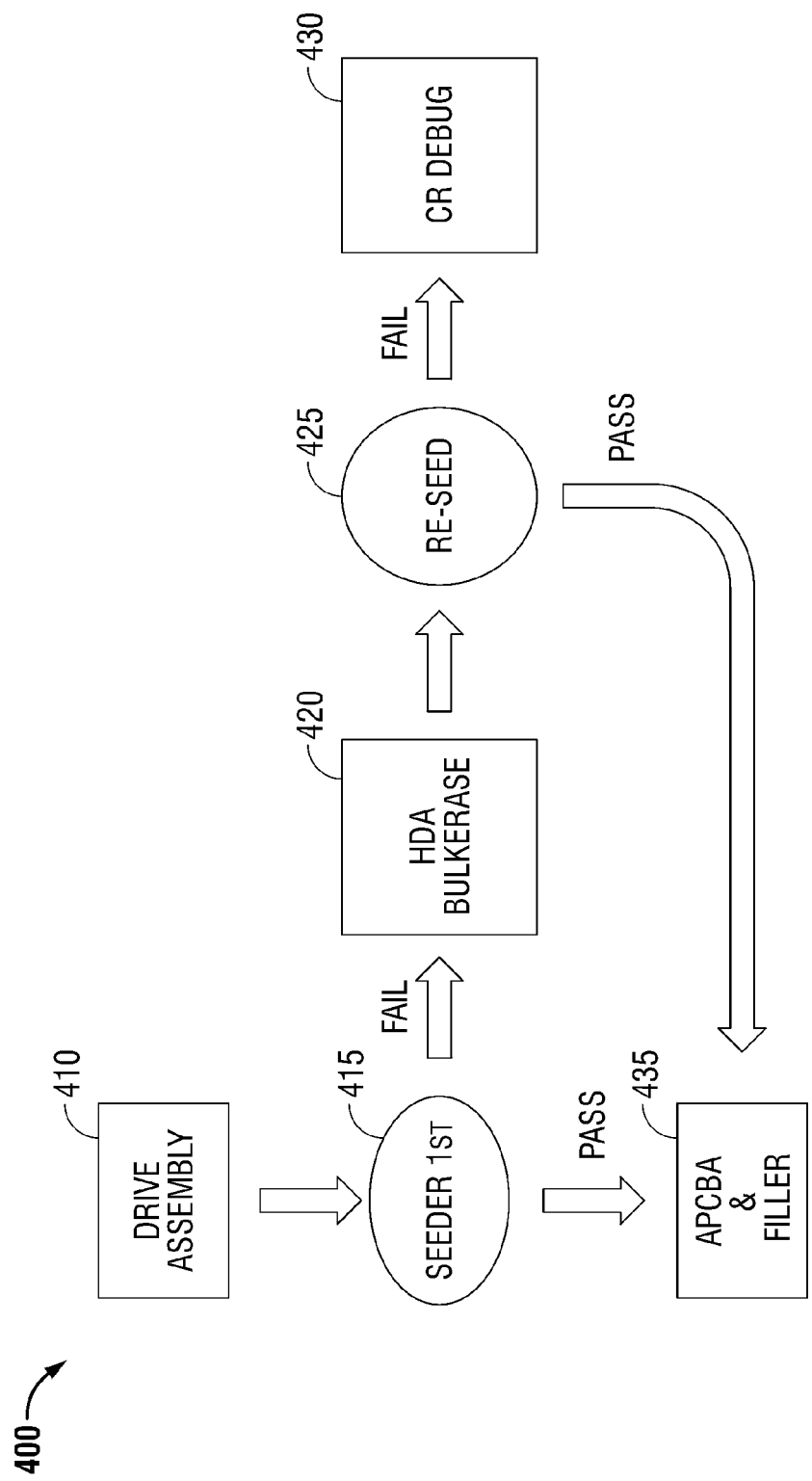
FIG. 4 is a flow diagram illustrating a process to test the seeding of a spiral servo pattern, according to one embodiment of the invention.

With reference to FIG. 4, a process 400 to test the seeding of the spiral servo pattern is illustrated, according to one embodiment of the invention. At block 410, the disk drive is assembled. This process step includes seeding the disk of the disk drive with a spiral reference pattern. At process step 415, the first seeding of the disk of the disk drive is tested. If the seeding reference pattern was correctly seeded, then at block 435, drive assembly procedures may continue such as attaching the printed circuit board assembly (APCBA) and filler (servo track writing based upon the seeded spiral reference pattern).

However, if the seeding test fails at process step 415, then the disk drive 10 may be inserted into the HDA bulk erase tool at block 420. As previously described, by: inserting the disk drive into the bulk erase tool having a first pair of square-shaped magnets positioned above the inserted disk drive and a second pair of triangular-shaped magnets positioned below the disk drive; rotating the disk of the disk drive; applying a first magnetic field to erase the top side of the disk and applying a second magnetic field to erase the bottom side of the disk; the disk media may be erased.

Next, at process step 425, process 400 next determines whether the re-seeding of the spiral reference pattern has been successful. If so, the disk drive testing operation has been successful and process 400 moves to process block 435 wherein the printed circuit board assembly is attached (APCBA) and filler (servo track writing based upon the seeded spiral reference pattern) occurs. On the other hand, if the re-seeding has failed, the disk drive is moved to the clean room for de-bugging (block 430).

It should be appreciated that after clean room de-bugging, the disk drive may be re-inserted into the HDA bulk erase tool to have the disk erased and be subject to another attempt at re-seeding the spiral reference patterns and re-testing for the success of the re-seeding. Further, after erasing the media of the disk with the HDA bulk erase tool components of the disk drive may be changed and further attempts at re-seeding and re-testing may occur.

It should be appreciated that although particular types of magnets such as pyramid-shaped magnets and square-shaped magnets have been described, that many other types of magnets may be utilized to perform embodiments of the invention. While the teachings of the invention have been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention as set forth in the appended claims. The specification and drawings are accordingly to be regarded as illustrative rather than restrictive.

What is claimed is:

1. A bulk erase tool to erase a perpendicular media recording (PMR) disk of a disk drive comprising:
   a housing to receive the disk drive; and
   a first pair of magnets comprising a first magnet and a second magnet mounted in the housing to be positioned above the received disk drive to provide a magnetic field to erase the top side of the disk and a second pair of magnets comprising a third magnet and a fourth magnet mounted in the housing to be positioned below the disk drive to provide a magnetic field to erase the bottom side of the disk,
   wherein the first magnet and the third magnet are vertically aligned with one another, and are of relatively opposite polar to one another,
   wherein the second magnet and the fourth magnet are vertically aligned with one another, and are of relatively opposite polar to one another, and
   wherein the second pair of magnets are approximately pyramid-shaped magnets.

2. The bulk erase tool of claim 1, wherein each of the magnets of the first pair of magnets are approximately parallel to one another.

3. The bulk erase tool of claim 1, wherein each of the magnets of the second pair of magnets are approximately parallel to one another.

4. The bulk erase tool of claim 1, wherein the first and second pair of magnets are approximately parallel to one another.

5. The bulk erase tool of claim 1, wherein the first pair of magnets are approximately square-shaped magnets.

6. The bulk erase tool of claim 1, wherein each of the magnets of the first and second pair of magnets comprise a CR material.

7. The bulk erase tool of claim 1, further comprising a power supply connected to the disk drive to power the disk drive such that the disk of the disk drive is rotatable.

8. A method to erase a disk of a disk drive, the method comprising:
   mounting a disk drive in a bulk erase tool having at least one of a first pair of magnets mounted in a housing to be positioned above the mounted disk drive and a second pair of magnets mounted in the housing to be positioned below the disk drive;
   rotating a disk of the disk drive;
   applying a first magnetic field to erase the top side of the disk;
   applying a second magnetic field to erase the bottom side of the disk;
   rotating the disk of the disk drive;
   seeding the disk of the disk drive; and
   detecting a failure of the seeding.

9. The method of claim 8, further comprising re-seeding the disk of the disk drive.

10. The method of claim 9, further comprising testing the re-seeded disk of the disk drive, wherein if the re-seeded disk passes testing, filler servo track writing is performed.

11. The method of claim 10, wherein if the re-seeded disk fails testing, the disk drive is debugged.

12. The method of claim 8, wherein each of the magnets of the first pair of magnets of the bulk erase tool are approximately parallel to one another.

13. The method of claim 8, wherein each of the magnets of the second pair of magnets of the bulk erase tool are approximately parallel to one another.

14. The method of claim 8, wherein the first and second pair of magnets of the bulk erase tool are approximately parallel to one another.

15. The method of claim 8, wherein one of the magnets of the first pair of magnets is approximately vertically aligned with one of the magnets of the second pair of magnets of the bulk erase tool.

16. The method of claim 15, wherein the magnet of the first pair of magnets and the magnet of the second pair of magnets of the bulk erase tool are of relatively opposite polarity to one another.

17. The method of claim 8, wherein the first pair of magnets of the bulk erase tool are approximately square-shaped magnets.

18. The method of claim 8, wherein the second pair of magnets of the bulk erase tool are approximately pyramid-shaped magnets.

19. The method of claim 8, wherein each of the magnets of the first and second pair of magnets of the bulk erase tool comprise a CR material.

20. The method of claim 8, further comprising applying power to the disk drive such that the disk of the disk drive is rotatable when the disk drive is mounted in the housing of the bulk erase tool.

* * * * *